United States Patent [19]

Otsuka

[11] Patent Number: 5,076,346
[45] Date of Patent: Dec. 31, 1991

[54] AIR CONDITIONER

[75] Inventor: Nobuo Otsuka, Kamakura, Japan

[73] Assignee: Mitsubishi Denki Kabushiki Kaisha, Tokyo, Japan

[21] Appl. No.: 556,382

[22] Filed: Jul. 23, 1990

Related U.S. Application Data

[62] Division of Ser. No. 207,625, Jun. 16, 1988, abandoned.

[30] Foreign Application Priority Data

| Jun. 17, 1987 | [JP] | Japan | 62-150513 |
| Aug. 24, 1987 | [JP] | Japan | 62-128209 |
| Aug. 24, 1987 | [JP] | Japan | 62-209875 |
| Sep. 2, 1987 | [JP] | Japan | 62-219910 |

[51] Int. Cl.[5] .................. F25B 29/00; F24F 7/00; F24F 3/044
[52] U.S. Cl. .................. 165/22; 236/49.3; 236/1 B; 165/16
[58] Field of Search .......... 165/22, 16; 236/49.3, 236/1 B, 1 C

[56] References Cited

U.S. PATENT DOCUMENTS

| 3,297,250 | 1/1967 | Capps | 236/1 C |
| 3,826,963 | 7/1974 | Lorenz | 165/22 |
| 4,530,395 | 7/1985 | Parker et al. | 165/16 |
| 4,635,445 | 1/1987 | Otsuka et al. | 165/22 |
| 4,646,964 | 3/1987 | Parker et al. | 165/11.1 |
| 4,716,957 | 1/1988 | Thompson et al. | 165/29 |
| 4,754,919 | 7/1988 | Otsuka et al. | 165/22 |
| 4,830,095 | 5/1989 | Friend | 165/22 |
| 4,890,666 | 1/1990 | Clark | 236/49.3 |

FOREIGN PATENT DOCUMENTS

| 67019 | 12/1986 | Austria . |
| 48-26056 | 7/1973 | Japan . |
| 51-87946 | 7/1976 | Japan . |
| 51-119146 | 10/1976 | Japan . |
| 57-169525 | 10/1982 | Japan . |
| 58-81438 | 6/1983 | Japan . |
| 59-14694 | 4/1984 | Japan . |
| 59-25933 | 6/1984 | Japan . |
| 61-31844 | 2/1986 | Japan . |
| 61-272544 | 12/1986 | Japan . |
| 62-9460 | 3/1987 | Japan . |

Primary Examiner—John Ford
Attorney, Agent, or Firm—Oblon, Spivak, McClelland, Maier & Neustadt

[57] ABSTRACT

A duct type of air conditioner wherein temperature in a plurality rooms are controlled independently, and which after having controlled opening and closing of dampers for the rooms, is capable of controlling air volume, controlling the opening and closing of each damper depending on the temperature in the room with the corresponding damper, or determining atuomatically whether to select heating and cooling, depending on each room temperature and an external air, thereby realizing an optimum and effective operation control. When the total opening degree of the dampers becomes less than a predetermined amount the opening degree of the damper feeding air to the room with the greatest heat load is revised to be open.

8 Claims, 14 Drawing Sheets

AIR CONDITIONER

This is a division of application Ser. No. 07/207,625. filed on June 16. 1988 now abandoned.

BACKGROUND OF THE INVENTION

1. FIELD OF THE INVENTION

The present invention relates to a duct type of air conditioner which adopts a variable air volume control system capable of controlling temperatures in a plurality of rooms independently.

2. DISCUSSION OF BACKGROUND

A conventional duct type air conditioner for a house and the like which can control the temperature in each room independently has operation modes such as an "OFF (stop)" mode, a "heating" mode, a "cooling" mode and a "ventilating" mode. The "ventilating" mode is selected to carry out ventilation between the rooms in a season which does not require cooling or heating. When an external air intake duct is connected to a main duct, external air can be taken into the rooms and cooling by the external air is possible though it is not always enough. In addition, it is possible to equalize by the ventilating operation the room temperatures in the rooms which are different from one another due to conditions such as solar radiation.

In general, the conventional air conditioner carries out the ventilating operation, opening dampers in all the rooms when the "ventilating" mode is selected.

There is Japanese Unexamined Patent Publication No. 31844/1986 as a first prior art reference, which discloses the cooling by external air is positively carried out in times before and behind summer.

In the first prior art reference, the damper in each room is opened or closed depending on whether the room temperature detected by a thermostat is higher or lower than the ventilating air temperature in the duct, in order to make the room temperature approach to a set temperature by use of the ventilating air.

The variable air volume control (hereinbelow, referred to as VAV) system for the duct type of air conditioner is classified into a throttle type and a bypass type. The throttle type is further classified into a, two-position control (on-off control) type and a proportional control 12 in terms of the way to control the damper.

An example of the throttle type of two-position control system is Japanese Unexamined Utility Model Publication No. 81438/1983 as a second prior art reference. The air conditioner as disclosed in the publication carries out the on-off control of the damper to minimize the difference in temperature between an upper portion and a lower portion in the room to be heated, thereby increasing comfort. At the time of heating, the on-off control is carried out so that when the room temperature is lower than a set temperature, the opening of the damper is maximum, when the room temperature is higher than the set temperature, the opening of the damper is minimum, and when the room temperature is approximate to the set temperature, the maximum opening and the minimum opening are repeated in a cycle.

In order to carry out such control, the difference between a detection signal by a room temperature detecting sensor and a detection signal by a room temperature setting device is input to a differential amplifier, the output from the differential amplifier is input with a signal from a pulse generator into an on-off time difference generator to output an on-off control signal to the damper.

Although the total air volume in the duct changes depending on the total opening degrees of the dampers to fluctuate the pressure in the duct, the capacity of an air blower in the air conditioner is controlled based on a detection signal by a pressure sensor to maintain the pressure in the duct constant.

There is Japanese Unexamined Patent Publication No. 119146/1976 as a third prior art reference. It described that electrically powered or electromagnetically powered dampers are arranged in the duct and that the dampers are controlled based on signals from the room thermostats to have a full-open state or a semi-open state so as to regulate the room temperatures. The damper for a room which does not require air-conditioning can be fully closed by a manual switch. A similar device is disclosed in Japanese Unexamined Utility Model Publication No. 87949/1976 as a fourth prior art reference.

There is Japanese Unexamined Patent Publication No. 169525/1982 as a fifth prior art reference. This prior art is directed to improve cooling air sense at the time of cooling. While the total air volume in the duct is held at a constant level, the air volume is successively delivered to a plurality of outlet ports by operating the dampers so that each outlet port feeds the air into the room intermittently. The damper operation in the fifth prior art is not carried out for the purpose of controlling the room temperature.

There is Japanese Examined Utility Model Publication No. 26056/1973 as a sixth prior art reference. This prior art describes that when on-off control type of dampers all are going to be closed, a specific damper is forcibly opened to prevent all the dampers from being closed simultaneously.

By the way, in order to carry out cooling operation and heating operation by a single device or a single system, a heat pump, the combination of a heat pump and a gas furnace, and the combination of an air conditioner and a gas furnace and so on have been proposed. Selecting the cooling operation and the heating operation is, in general, done by switching a manual switch.

Although, in principle, the cooling operation is selected in summer and the heating operation is selected in winter, frequent switching operations can be required. For example, at the turn of a season, one day needs heating and the next day needs cooling. In the region having a continental climate, there is a case that a night time requires heating though a day time requires cooling. In these cases, if the switching of the cooling and heating operation is not done adequately, comfortable air-conditioning (cooling and heating) can not be obtained.

Some proposals have been offered to automatize the cooling and heating switching control for an air conditioner wherein a room is air-conditioned by a single heat source device. One of the proposals is disclosed in Japanese Examined Utility Model publication No. 9460/1987 as a seventh prior art reference. This prior art discloses that the room temperature $T_R$ is compared to preset reference temperatures $T_1$, $T_2$ and $T_3$ ($T_1 < T_2 < T_3$), and that when $T_R$ is higher than $T_2$ at the time of turning on the power, a cooling operation mode is selected, while when $T_R$ is lower than $T_1$ at the time of turning on the power, a heating operation mode is selected. After that, if $T_R$ becomes lower than $T_1$, the cooling operation mode is shifted to the heating operation mode, while $T_R$ becomes higher than $T_3$ the heating operation mode is shifted the cooling operation mode.

In addition, Japanese Examined Patent Publication No. 14694/1984 as an eighth prior art reference discloses a similar device. This device has a first control mode wherein when the room temperature is higher than a target temperature, cooling is selected and when the room temperature is lower than the target temperature by a predetermined value, heating is selected, and a second control mode wherein when the room temperature is lower than the target temperature, heating is selected and when the room temperature is higher than the target temperature by a predetermined value, cooling is selected. When the room temperature is higher than the target temperature at the time of starting the device, the device is controlled under the first control mode. When the room temperature is lower than the target temperature at that time, the device is controlled under the second control mode. When the room temperature has approached the target temperature during the heating operation under the first control mode, the first control mode is shifted to the second control mode to continue to control the device under the second control mode. When the room temperature has approached the target temperature during the cooling operation under the second control mode, the second control mode is shifted to the first control mode to continue to operate the device under the first control mode.

Japanese Unexamined Patent Publication No. 272544/1986 has a ninth prior art reference and Japanese Examined Patent Publication No. 25933/1984 has a tenth prior art reference which disclose similar devices.

It has been known to automatize the cooling and heating switching control for a duct type of air conditioner wherein a single heat source device is utilized and a plurality of rooms are provided with thermostats to regulate the room temperature in each room by the corresponding thermostats. An example is U.S. Pat. No. 4530395 as an eleventh prior art reference. It discloses that each thermostat is provided with a switch for changing cooling and heating and a setting device for setting a set room temperature for cooling and a set room temperature for heating, and that a monitor compares a demand for cooling or heating from each room thermostat with one another to select an operation mode based on the results of comparison, thereby controlling the damper of a room that requires the same operation mode as that selected by the monitor to regulate the temperature in the room while closing the dampers of other rooms.

With regard to the control system as disclosed in the first prior art reference wherein the ventilating operation is carried out while opening all dampers, there is a first problem in that the ventilating air is fed into a room without an occupant to increase the expense for driving the air blower.

Although the system wherein the dampers are automatically controlled depending on the ventilating air temperature is effective in the case of the intake of sufficient volume of the external air, it is not effective when the intake volume of the external air is small and the room temperature control by the external air is difficult in the houses and so on. This is a second problem.

With regard to the air conditioner as disclosed in the second prior art reference, the temperature distribution in a room on heating can be improved and the room temperature can be controlled to reach a set temperature. However, when the number of the dampers is small and the dampers are controlled to be fully opened and fully closed, the case wherein all dampers are fully closed simultaneously happens frequently. In each case, it is necessary to stop the heat source device and the air blower and then restart them. As a result, the deviation in the room temperature from the set temperature and the number of the on and off of the heat source device are increased. This is a third problem.

In particular, the third problem usually happens to the domestic system because the number of rooms is small, a forcible ventilation is not usually done and a heat load is small.

As for the air conditioner as described in the third and fourth prior art references, it is possible to prevent the heat source device and the air blower from being frequently stopped because the dampers are carried out to have a full-open state or a semi-open state. However, when the heat load is small, it is difficult to control the room temperature precisely to become the set temperature, leading to a situation wherein the room temperature is beyond the set temperature on heating. This is a fourth problem.

In respect of the air conditioner as described in the sixth prior art reference, when all dampers are going to be closed, a specific damper is forcibly opened. As a result, it is impossible to control the temperature in the room with the damper forcibly opened to achieve the set temperature desired, and it is against energy-saving. This is the fifth problem.

In reference to the air conditioner as disclosed in the seventh through the tenth prior art reference, their control systems are effective when a single thermostat is used to air-condition a single room. However, when the temperatures in a plurality of rooms are controlled by thermostats, these systems are not applicable because the set temperatures for the rooms are different from one another. This is a sixth problem.

With regard to the air conditioner of the eleventh and the twelfth prior art references, although switching the cooling operation and the heating operation for the entire system can be automatically carried out, selecting the cooling operation and the heating operation in each thermostat must be carried out manually, which is troublesome. This is a seventh problem.

SUMMARY OF THE INVENTION

It is an object of the present invention to solve the problems as discussed above and to provide a duct type of air conditioner wherein temperature in a plurality rooms are controlled independently, and which after having controlled opening and closing of dampers for the rooms, is capable of controlling air volume, controlling the opening and closing of each damper depending on the temperature in the room with the corresponding damper, or determining automatically whether to select heating and cooling, depending on each room temperature and an external air, thereby realizing an optimum and effective operation control.

It is another object of the present invention to solve the first and second problems and to provide an air conditioner wherein signals from thermostats having an "OFF" mode are detected by data input means, dampers are controlled by damper control means depending on the results of the detection and then the operation of an air blower is controlled by air blower control means, whereby the damper control means closes the damper for a room which is detected to be set the "OFF" mode by the data input means and opens the damper of a room which is detected to be set to other modes by the data input means, and after that, the air blower control means controls the capacity of the air blower to maintain a static pressure in a duct after the damper control has been done so as to provide stable ventilation only to the room that needs ventilation.

It is a further object of the present invention to overcome the third through the fifth problems and provide an air conditioner wherein the magnitude in a heat load for each room is detected by a room thermostat which is arranged in each room, the ascending or descending order of the magnitudes is measured by heat load measuring means, selection of opening and closing dampers for carrying out a normal room temperature control is determined by damper opening determining means based on the results of the measure, and when the total opening degrees of the dampers given by the results of the determination is lower than a predetermined value, damper opening revising means opens the damper of a room which has a great deal of heat load to control the opening and closing operation of the damper of each room by damper control means based on the revised value, whereby when the total opening degrees of the dampers determined by the damper opening determining means is zero or a value of opening degrees which obstructs the continued operation of a heat source device, the damper opening revising means forces the damper of one or more rooms with an great deal of heat load to open under a definite condition so as to reduce the incidents that all dampers are simultaneously closed and also so as to decrease the number of the on-off operation of the heat source device.

It is a still another object of the present invention to eliminate the sixth and the seventh problems and to provide an air conditioner wherein the temperatures in a plurality of rooms and the temperature of an external air are measured by temperature measuring means based on signals from thermostats arranged in the rooms, and from an external air temperature sensor. Selection of cooling and heating is determined by first cooling and heating determining means based on an average room temperature of the room temperatures immediately after an operation mode has changed to an automation mode based on the results of the measure, and after that, when a heat source device is at a standstill, selection of cooling and heating is determined again by second cooling and heating judgment means based on the external air temperature, whereby when the average room temperature is higher than a reference value $T_1$ immediately after the operation mode has changed to the automation mode, the first cooling and heating determining means selects cooling, when the average room temperature is lower than the reference value just after the change to the automation mode, the first cooling and heating determining means selects heating; when the external air temperature is higher than a reference value $T_2$ during the halt of the heat source device, the second cooling and heating determining means selects cooling, when the external air temperature is lower than a reference value $T_3$ ($T_2 > T_3$) during the halt of the heat source device, the second cooling and heating determining means selects heating; and when the external air temperature is between the reference values $T_2$ and $T_3$, the second cooling and heating determining means calculates the halting time of the heat source device, when a value given by the calculation is greater than a reference time, the second cooling and heating determining means selects cooling (at the time of heating) and heating (at the time of cooling) so as to select an optimum operation mode automatically even if the heat load changes due to the external air temperature and so on.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Now, a first embodiment of the present invention will be described in reference to the accompanying drawings.

Figure 1:
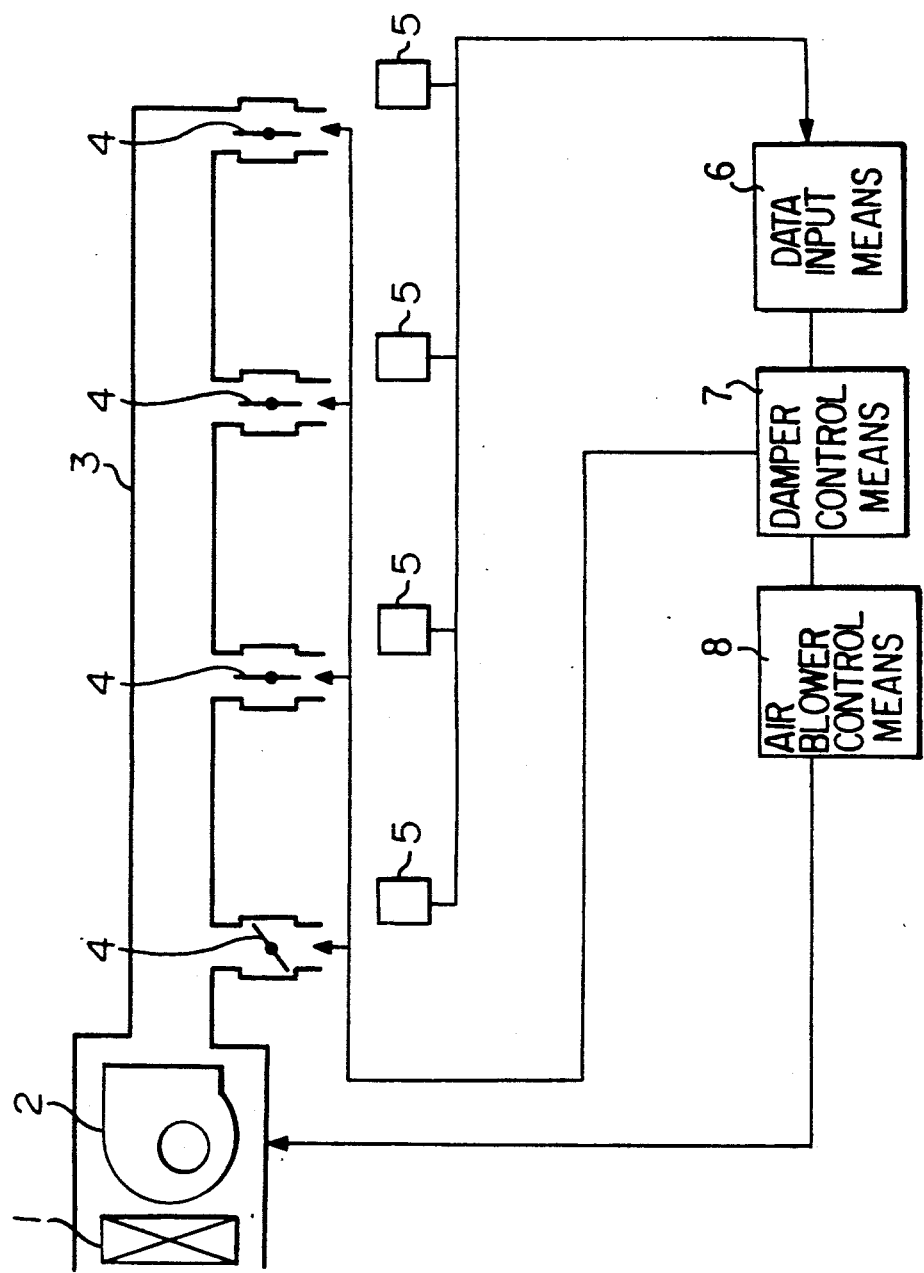
FIG. 1 is a schematic view showing the basic structure of an embodiment of the air conditioner according to the present invention.

FIG. 1 is the schematic view showing the basic structure of the first embodiment. As clearly seen from FIG. 1, the air conditioner of the first embodiment is constructed by a heat source device 1 for producing heated air and cooled air, an air blower 2, a duct 3 for distributing the heated (cooled) air and ventilating air to a plurality of rooms, dampers 4 arranged in a plurality of branch ducts which are connected to the duct 3, and thermostats 5 arranged in the rooms so as to correspond to the dampers 4 and having an "OFF" mode.

The mode status of each thermostat 5 is detected by data inputting means 6. Based on the results of the detection, damper control means 7 closes the damper of the room with the "OFF" mode set, and opens the damper of the room with other mode set. After that, air blower control means 8 controls the operation of the air blower 2 so as to make static pressure in the duct 3 achieve predetermined level.

Figure 2:
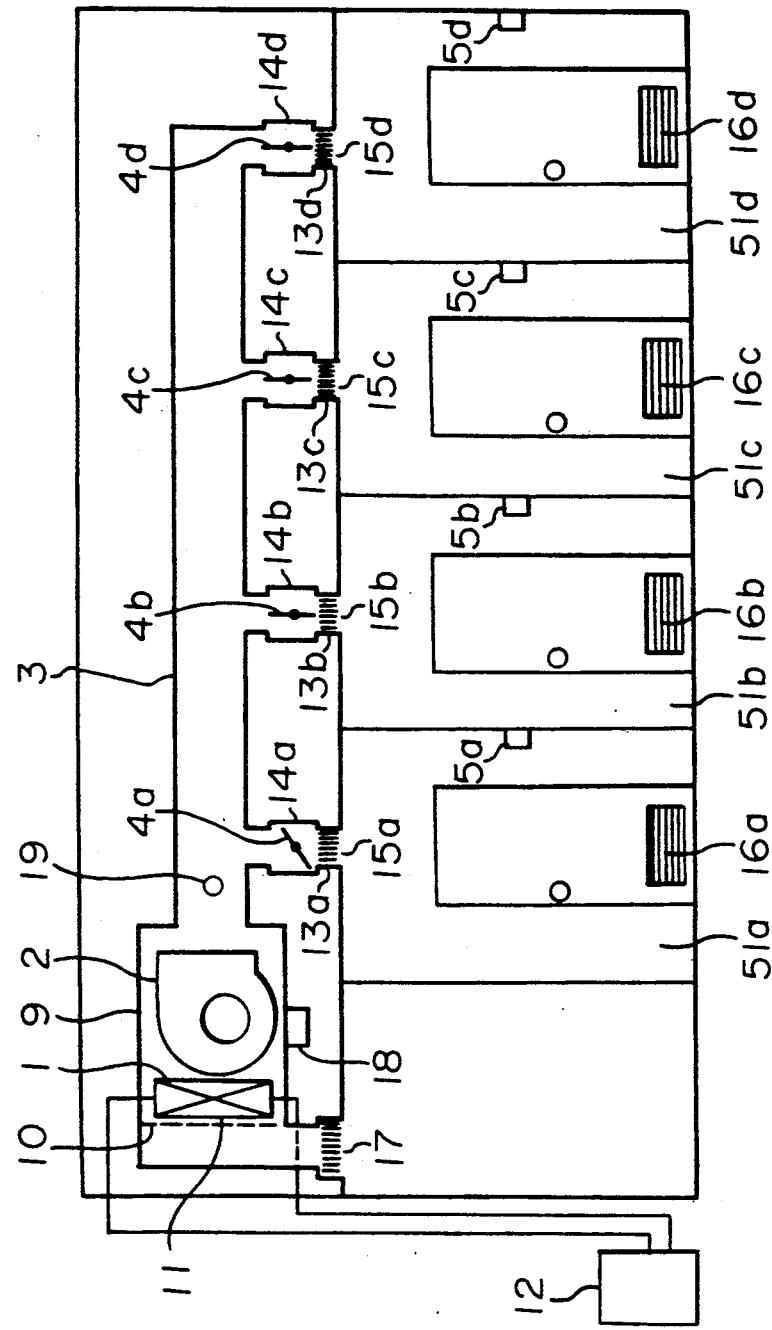
FIG. 2 is a schematic view showing the entire system of the embodiment.

FIG. 2 is the schematic view showing the entire system of an air conditioner with the principle as shown in FIG. 1 applied. In FIG. 2, reference numeral 9 designates an indoor unit constituting a heat pump as the heat source device 1, which is placed in the ceiling of a house and so on. The indoor unit includes the air blower 2, a filter 10 and a heat exchanger 11. Reference numeral 12 designates an outdoor unit which is placed outdoors. Reference numerals 13a-13d designate the branch ducts which are provided to communicate between the rooms 51a-51d and the duct 3 connected to the indoor unit 9. Reference numerals 14a-14d designate VAV (valuable air volume) units which are arranged in the respective branch ducts 13a-13d and include dampers 4a-4d which are controlled by electric motors and so on to be opened and closed.

Outlet ports 15a-15d into the rooms are connected to the branch duct 13a-13d. The rooms are provided with inlet ports 16a-16d which are formed in doors and so on.

An intake port 17 is formed in the ceiling of a hallway so as to be positioned on the intake side of the indoor unit 9. The indoor unit 9 is provided with a controller 18.

In the duct 3 is provided a pressure sensor 19.

The room thermostats 5a-5d arranged in the rooms are provided with room temperature detectors (not shown) and room temperature setting devices (not shown), and are also provided with mode switches for setting the ON/OFF of heating, air-conditioning and ventilating in the corresponding rooms. One of the room thermostats 5a-5d also has a function as a main controller for turning on the power and changing the operation modes.

Figure 3:
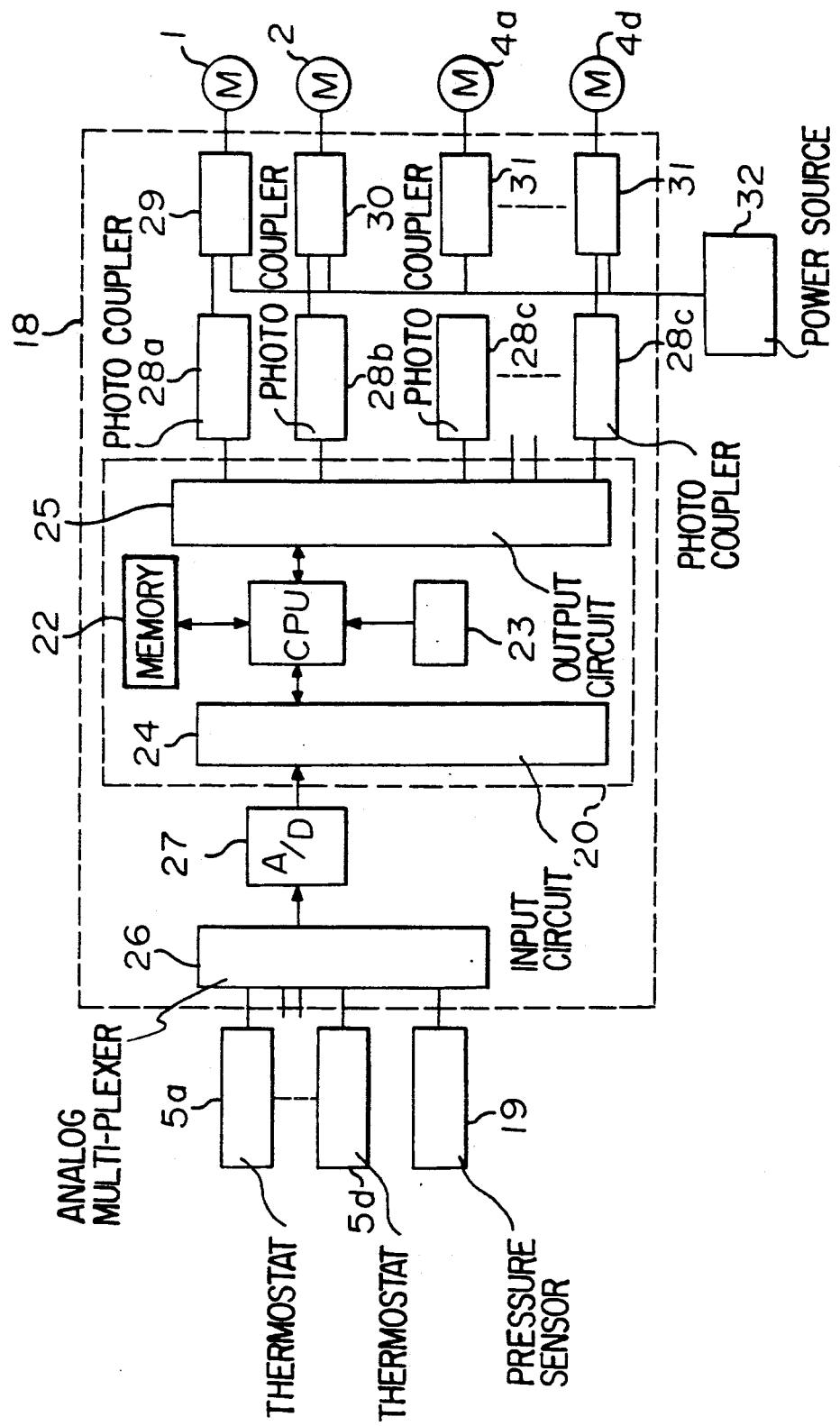
FIG. 3 is a block diagram showing the structure of a controller used in the embodiment.

FIG. 3 is the block diagram showing the controller 18. In FIG. 3, reference numeral 20 designates a microcomputer constituting the controller 18, which comprises a CPU 21, a memory 22, a timer 23, an input circuit 24 and an output circuit 25.

Reference numeral 26 designates an analog multiplexer, into which detection signals from the room thermostats 5a-5d and the pressure sensor 19 are input. The output of the analog multi-plexer 26 is converted into a digital signal by an A/D (analog/digital) converter 27 and the converted digital signal are input into the CPU 21 through the input circuit 24.

The output circuit 25 is connected to a heat source device controller 29 to a photo coupler 28a so that the output of the output circuit is fed to the heat source device 1.

Similarly, the output circuit 25 is connected to an air blower controller 30 through a photo coupler 28b. The controller 30 is constituted by an inverter and so on to control the revolution of the air blower 2.

In addition, the output circuit 25 is connected to damper controllers 31 through photo couplers 28c. Each damper controller 31 is constituted by a relay and so on to control the opening and closing operation of each damper 4a-4d.

Reference numeral 32 designates a power source for feeding power to the controller 18.

Now, the operation of the first embodiment will be explained in reference to FIG. 4.

Figure 4:
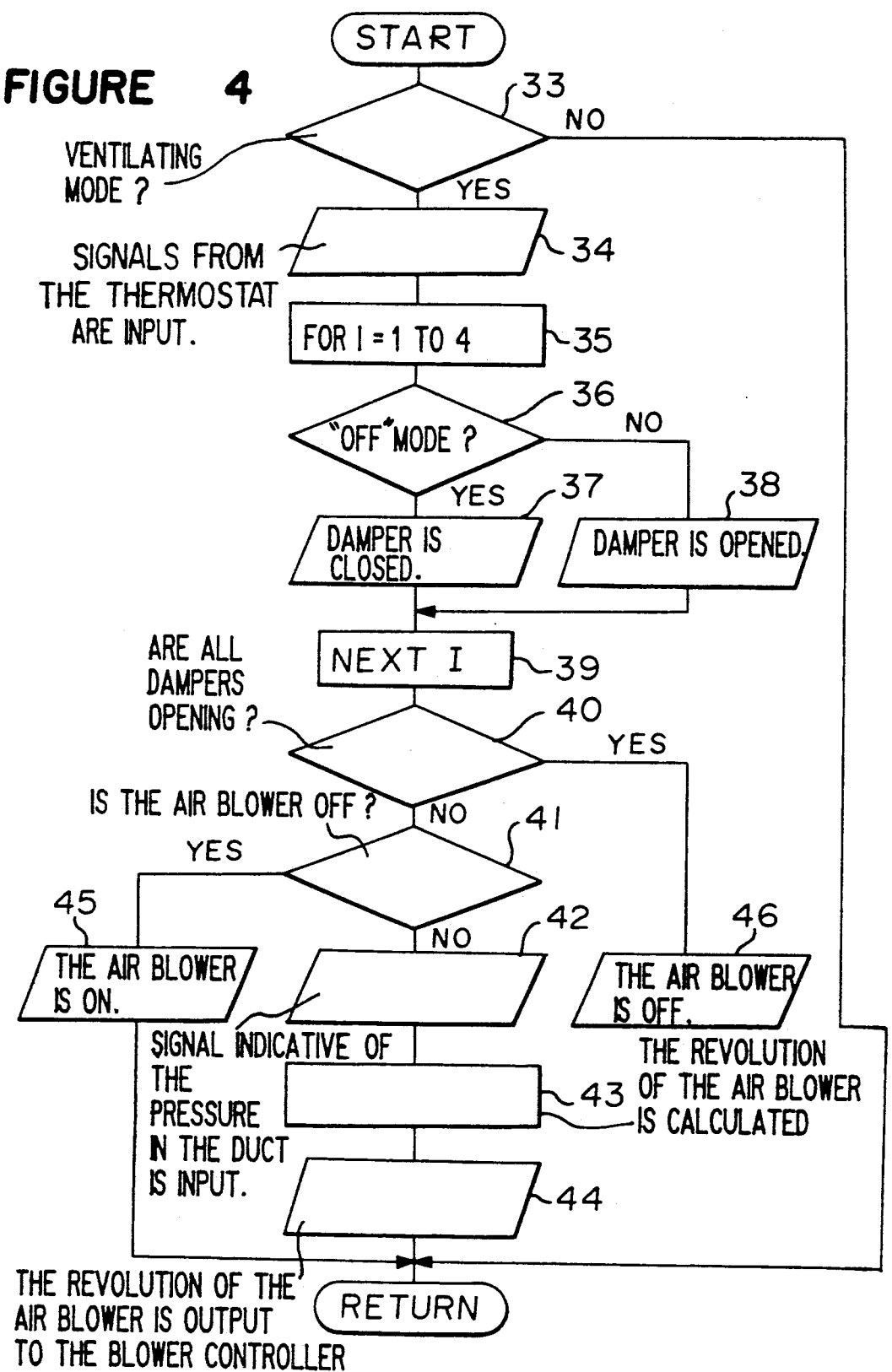
FIG. 4 is a flow chart to help explain the operation of the controller of FIG. 3.

FIG. 4 is the flow chart showing a control program for a ventilating operation, which is stored in the memory 22 of the microcomputer 20.

At a step 33, it is detected whether the operation mode of the system is the ventilating mode or not. When the operation mode is detected to be an operation mode other than the ventilating mode, i.e. OFF, cooling or heating modes, the processing escapes from the control routine. Only when the operation mode is detected to be the ventilating mode, the processing proceeds to the next step 34. At the step 34 which is executed as the data input means 6, direction signals from the thermostats 5a-5d are input into the CPU 21 through the analog multi-plexer 26, the A/D converter 27 and the input circuit 24. Then, the processing as shown at a step 35 through a step 39 as the damper control means 7 are executed. Between the step 35 and the step 39, whether the mode switch of the thermostat 5a, 5b, 5c or 5d arranged in each room has the "OFF" mode is detected at the step 36. The step 35 as shown is the case wherein the number of the rooms to be controlled is four. As the result of the detection, when the "OFF" mode is detected to be set, a signal indicative of closing the damper is output at the step 37. When the "OFF" mode is detected not to be set, a signal indicative of opening the damper is output at the step 38. These outputs are sent from the CPU 21 to the damper controllers 31 through the output circuit 25 and the photo couplers 28c to control the opening and closing (opening degree) of the dampers 4a-4d. After that, the processing as shown at a step 40 through a step 46 is executed at the air blower control mean 8. At the step 40, it is judged whether a valve of the total opening degrees of the dampers 4a-4d is zero or not as the result of the processing executed as the damper control means 7. When the value of the total opening degrees is judged not to be zero, the processing proceeds to the step 41, where it is at a judged whether the air blower 2 is standstill or not at that moment. When the air blower 2 is being driven, the processing proceeds to the step 42, wherein a signal detected by the pressure sensor 19 is input to the CPU 21. At the next step 43, the static pressure detected in the duct 3 is compared to a reference static pressure to calculate the revolution newly required for the air blower 2. At the step 44, the result of the calculation is output to the air blower controller 30 through the output circuit 25 and the photo coupler 28b to control the air blower 2.

By the way, when the air blower 2 is judged to be at a standstill at the step 41, the processing proceeds to the step 45 where the air blower 2 starts to be driven. When of the total opening degrees of the damper 4a-4d is judged to be zero at the step 40, the processing proceeds to the step 46 where the air blower 2 is stopped.

These controls are repeated by the timer 23 by a definite cycle.

As explained above, in accordance with the first embodiment, the system is constructed such that the damper control means controls the dampers based on the operation mode of each thermostat detected by the data input means during the ventilating operation and then the air blower control means carries out the volume control of the air blower. As a result, the occupant can optionally select a room to be ventilated as desired so as to save the expense required for the power. In addition, there is an advantage that stable ventilating air is fed from each outlet port.

Now, a second embodiment of the air conditioner according to the present invention will be explained in reference to the accompanying drawings.

Figure 5:
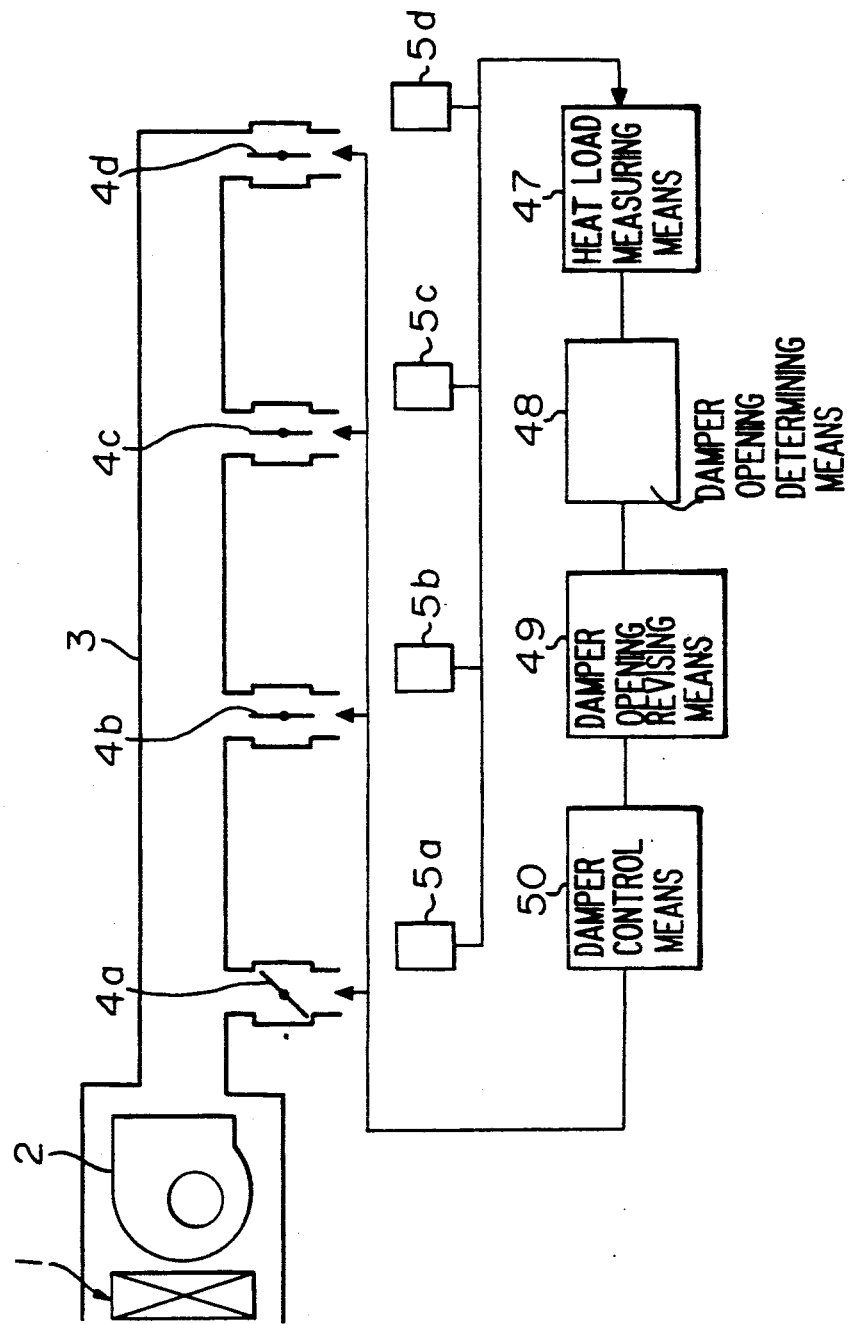
FIG. 5 is a schematic view showing the basic structure of a second embodiment of the air conditioner of the present invention.

FIG. 5 is the schematic view showing the basic structure of the second embodiment. In FIG. 5, the same reference numerals as FIG. 1 designate similar parts. Explanation on the similar parts will be omitted for the sake of clarity.

The system of the second embodiment is constructed so that signals detected by the room thermostats 5a–5d are input to heat load measuring means 47 to measure the magnitude of the heat load in each room and determine the ascending or descending order of the magnitude of each heat load; damper opening determining means 48 decides the opening degree of the dampers 4a–4d of the rooms, to be the opening state or the closing state based on the measured heat load; when a value of the total opening degrees of the dampers 4a–4d caused by the results of the determination is found to be smaller than a value (a minimum value as the total opening degrees), damper opening revising means 49 revises the opening degree of the damper for a room with a great deal of heat load under a definite condition to be changed to the opening state; and damper control means 50 controls the opening and closing operations of each damper 4a–4d based on the results of determination after the revision.

Figure 6:
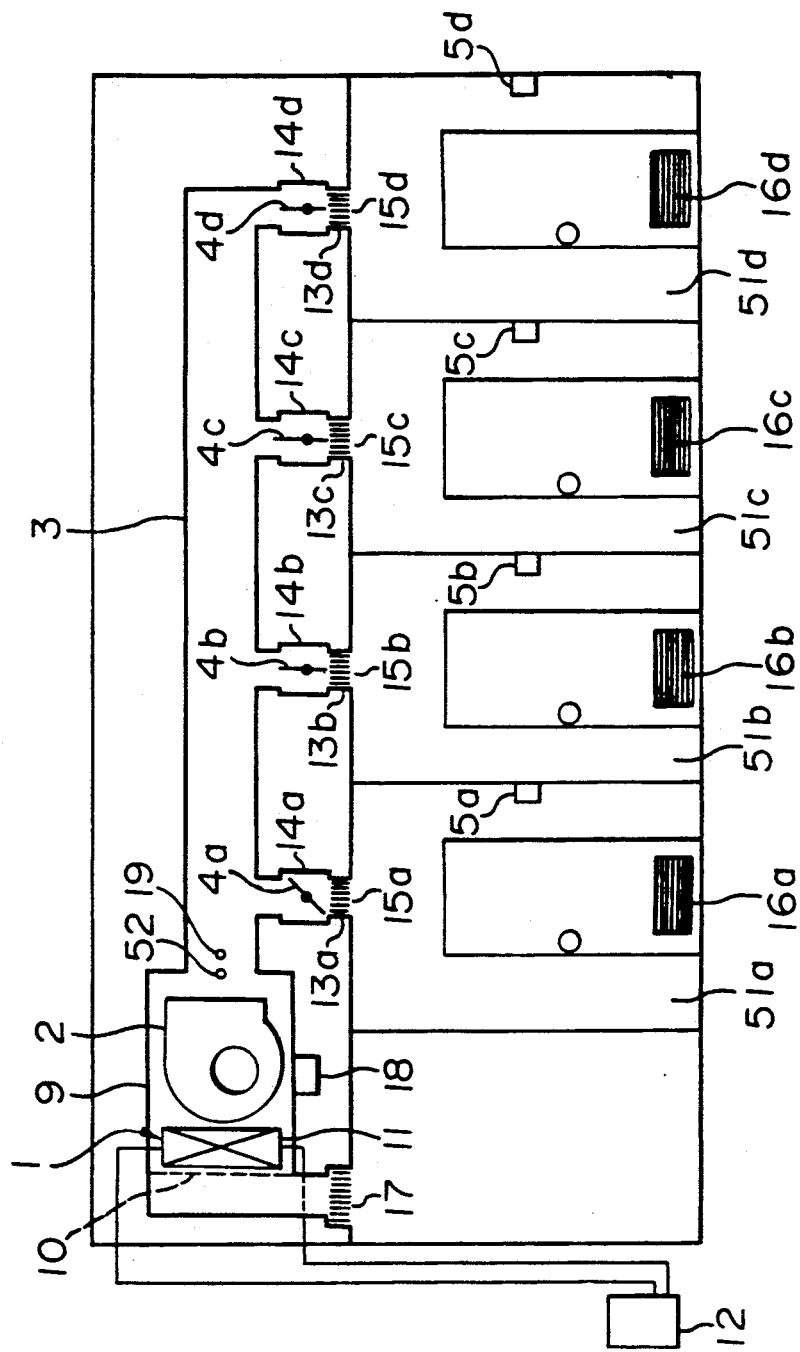
FIG. 6 is a schematic view showing the entire system of the second embodiment.

FIG. 6 is the schematic view showing the entire system of an air conditioner with the principle as shown in FIG. 5 applied. In FIG. 6, the same reference numeral as FIG. 2 indicate similar parts. Explanation on the similar parts will be omitted for the sake of clarity. In addition to the pressure sensor 19, a temperature sensor 52 is provided in the duct 3.

Figure 7:
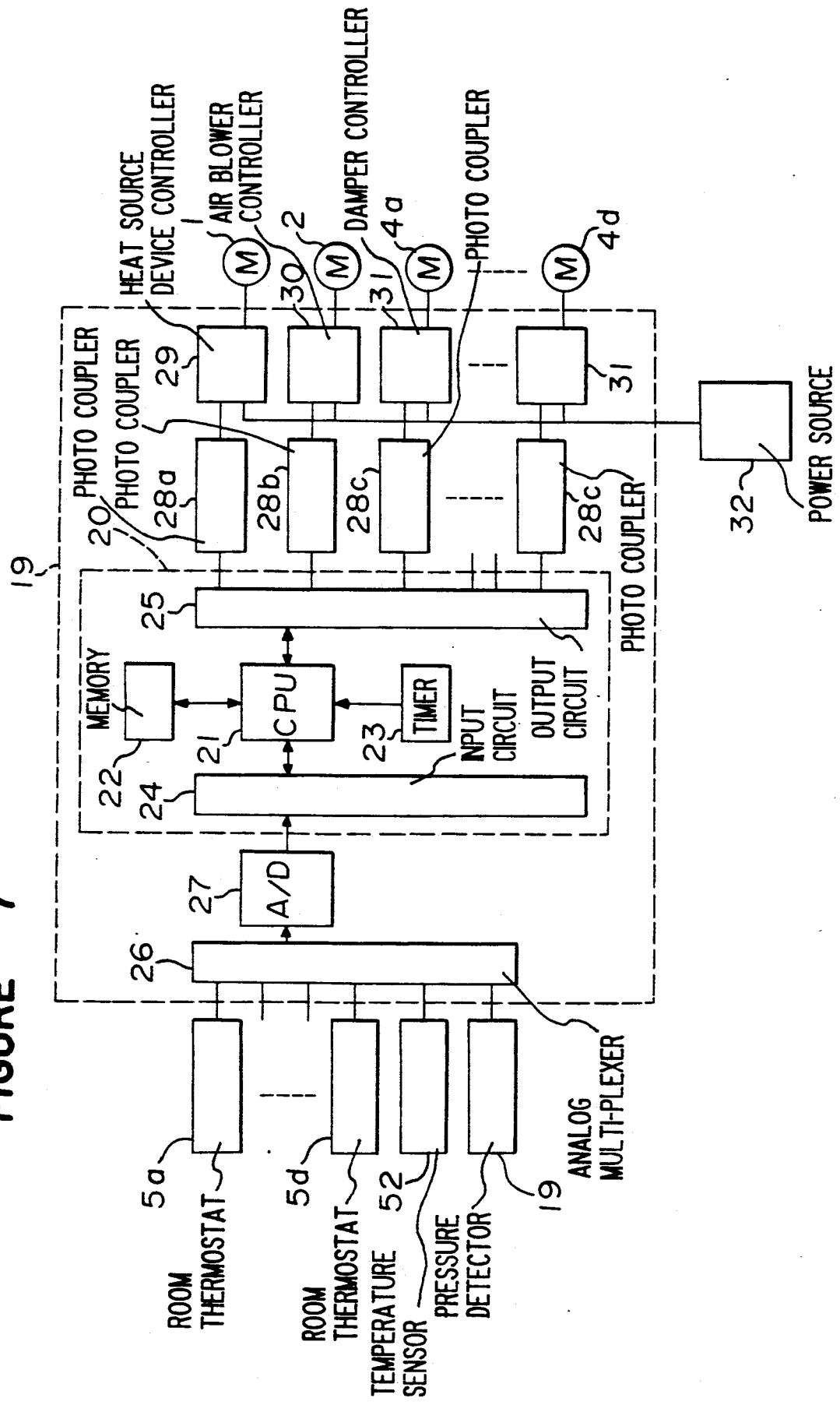
FIG. 7 is a block diagram showing the structure of a controller used in the second embodiment.

FIG. 7 is the block diagram showing a specific circuit of the controller 18. In FIG. 7, the same reference numerals as FIG. 3 indicate similar parts. Explanation on the similar parts will be omitted for the sake of clarity.

Detection signals from the room thermostats 5a–5d, the temperature sensor 12 and the pressure sensor 19 are input to the analog multi-plexer 26. The output of the analog multi-plexer is converted into a digital signal by the A/D (analog/digital) converter 27 to be input to the CPU 21 through the input circuit 24.

Figure 8:
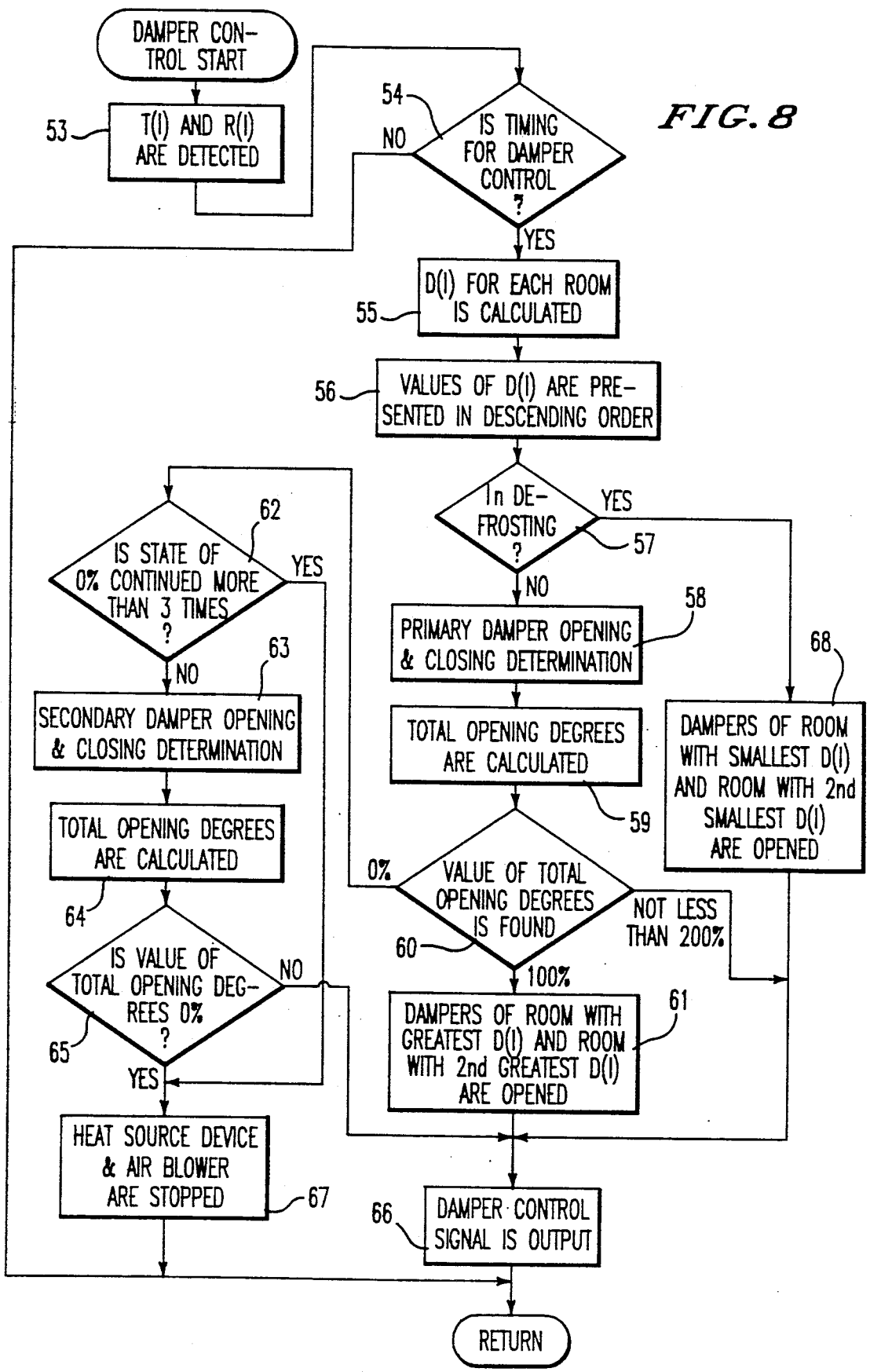
FIG. 8 is a flow chart to help explain the operation of the controller of FIG. 7.
Figure 9:
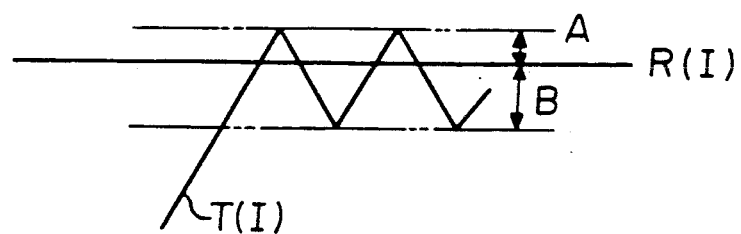
FIG. 9 is a drawing showing the relation between a set room temperature and a room temperature to help explain the operation of the second embodiment.

Now, the operation of the second embodiment at the time of heating will be explained in reference to FIGS. 8 and 9. FIG. 8 is the flow chart showing a control program for a damper control stored in the memory 22 of the microcomputer 20. FIG. 9 is the drawing showing the changing state in the room temperature to be controlled to the set room temperature to help explain the operation.

First, the processing as shown at steps 53 through 56 is executed at the heat load measuring means 47. Namely, the values indicative of a room temperature T(I) and a set room temperature R(I) for each room are input from each room thermostat 5a, 5b, 5c or 5d to the CPU 21 through the analog multi-plexer 26, the A/D converter 27 and the input circuit 24 (at the step 53). The reference "I" indicates a room number.

At the next step 54, it is checked whether timing for damper control is needed or not. When the timing for damper control is needed, the processing proceeds to the next step 55. When not, the processing escapes from the routine for the damper control. At the step 55, a heat load D(I) for each room is found by R(I)−T(I) on heating and T(I)−R(I) on cooling. At the next step 56, the values of D(I) are presented in descending order so that the order from the room with the greatest heat load (the room having the maximum of D(I)) to the room with the smallest heat load (the room having the minimum D(I)) is found.

At the next step 57, it is judged whether the heat source device 1 is in defrosting or not. When it is not in defrosting, the processing proceeds to the next step 58.

At the step 58 as the damper opening determining means 48, it is determined whether the damper of each room should be opened or closed, depending on the magnitude of D(I).

As shown in FIG. 9, the opening and closing of each damper is carried out so that when the room temperature T(I) at the present time is higher than the set temperature R(I) by A°C or more, the damper 4a, 4b, 4c or 4d is closed; when T(I) is lower than R(I) by B°C or more, the damper 4a, 4b, 4c or 4d is opened; and when T(I) is in the range of R(I)+A°C to R(I)−B°C, the opening and closing state of the damper is not changed.

Next, the processing at steps 59 through 65 is executed at the damper opening revising means 49. At the step 59, the total opening degrees of the dampers, the opening and closing of which has been determined at the step 58, is found (the sum of the opening degree of each damper is calculated so that, for example, if three dampers are opened, the sum is 300%).

At the next step 60, the value of the total opening degrees of the dampers 4a–4d are found. When the value of the total opening degrees is not less than 200%, the processing proceeds to a step 66 as described later. In the second embodiment, the minimum value of the total opening degrees is set to be 200%. When the value of the total opening degrees is 100%, that is to say, only one of the dampers is opened, the processing proceeds to the next step 61. At the step 61, the dampers of the room with the greatest heat load and the room with the second greatest heat load, which have been found at the step 56, are controlled to be in the opening state so as to obtain 200% as the total opening degrees.

The control as being carried out at the step 61 is repeatedly done as long as there is at least one room wherein the room temperature does not reach the set room temperature. After the processing at the step 61 completed, the processing proceeds to the step 66. By the way, when the value of the total opening degree is found to be zero % at the step 60, the processing proceeds to a step 62.

At the step 62, it is checked whether the state of zero % as the total opening degrees is continued more than three times, and if affirmative, the processing proceeds to step 67.

If negative, the processing proceeds to the next step 63.

At the step 63, it is again determined whether the damper 4a, 4b, 4c or 4d of each room should be opened or closed. When the room temperature T(I) is lower than the set room temperature R(I)+A, the damper for the corresponding room is opened.

The damper which is decided to be closed at the step 58, if the inequality, T(I)<(R(I)+A) is satisfied, is changed to be in the opening state.

Such determination is applied only to the room with the greatest heat load. When the inequality, T(I)<(R(I)+A) is satisfied, the dampers of the room with the greatest heat load and the room with the second greatest heat load are revised to be in the opening state to have 200% as the total opening degrees of the dampers.

At the next step 64, the total opening degrees of the dampers 4a–4d are calculated again. At the next step 65, the value of the total opening degrees is found, and if it is not zero %, (namely, 200%), processing proceeds to the next step 66. At the step 66 as the damper control means 50, a signal is output to the damper controller 31 through the output circuit 25 and the photo coupler 28c to carry out the opening and closing operation of the dampers 4a–4d.

By the way, when the heat source device 1 is found to be in defrosting at the step 57, the processing proceeds to a step 68. At the step 68, the dampers of the room with the smallest heat load and the room with the second smallest heat load are controlled to become in the opening state, and the dampers of other rooms are controlled to be in the closing state. After that, the processing proceeds to the step 66. This control can ease phenomenon wherein the room temperature is decreased due to cooled air which is produced at the time of defrosting by the reverse cycle operation of the heat pump. When the state of zero % as the total opening degrees of the dampers 4a–4d is continued more than three times at the step 62, or when the value of the total opening degree is found to be zero at the step 65, the processing proceeds to a step 67. The step 67 is a special subroutine where the heat source device 1 and the air blower 2 are stopped.

Detailed explanation on the processing which follows will be omitted for the sake of clarity. The detection signals from the temperature sensor 52 and the pressure sensor 19 are digitalized by the A/D converter 27 through the analog multi-plexer 26, and the digitalized ones are input to the CPU 21 through the input circuit 24.

The CPU 21 sends control signals to the heat source device controller 29 and the air blower controller 30 through the output circuit 25 and the photo couplers 28a, 28b. Thus, the capacities of the heat source device 1 and the air blower 2 are varied so that the temperature and the pressure of the ventilating air are controlled to have substantially definite level. These controls are repeated by the timer 23 by a definite cycle.

As explained, in accordance with such controls, heated air is intermittently blown out of the outlet ports 15a–15d into the rooms. The air flow from the opened damper 4a, 4b, 4c or 4d has enough air volume (wind rate) to arrive nearly to the floor. As a result, the difference between the temperature in the upper portion and that in the lower portion in the room is minimized to obtain good temperature distribution.

In addition, the case that all dampers 4a–4d are simultaneously closed is reduced. The number of the on and off of the heat source device 1 and that of the air blower 2 are minimized to obtain stable operation. Further, since the minimum value of the total opening degrees of the dampers is 200%, it is possible to prevent the heat source device 1 and the air blower 2 from being driven at small air volumes and small capacities, which are not effective.

Although, in the second embodiment, the number of the dampers is four and the minimum value of the total opening degrees is 200%, the minimum value of the total opening degrees can be determined depending on the number of the dampers and the variable volume ranges of the heat source device 1 and the air blower 2, to be 300% as the minimum value of the total opening degree for six dampers, 100% as the minimum value for three dampers, or 100% as the minimum value for four dampers, for example.

In addition, although, in the second embodiment, the step 62 finds whether the state of zero % as the value of the total opening degree of the dampers is continued more than three times, the number is not limited to three. The step 62 may be omitted.

By the way, the values of A and B in FIG. 9 can be decided optionally.

In the second embodiment, when the value of the total opening degrees is found to be 100% at the step 60, the dampers of the rooms with the greatest and the second greatest heat load are opened at the step 61 to have 200% as the value of the total opening degrees. In this case, there can be a case that the room temperature in the room with the second greatest heat load which has already reached the set room temperature, becomes slightly beyond the set room temperature. In addition, in the second embodiment, the relation of the numbers of the dampers and the minimum value of the total opening degrees can not be selected automatically. Next, a modified embodiment to the second embodiment, which improves these problems, will be explained.

Figure 11:
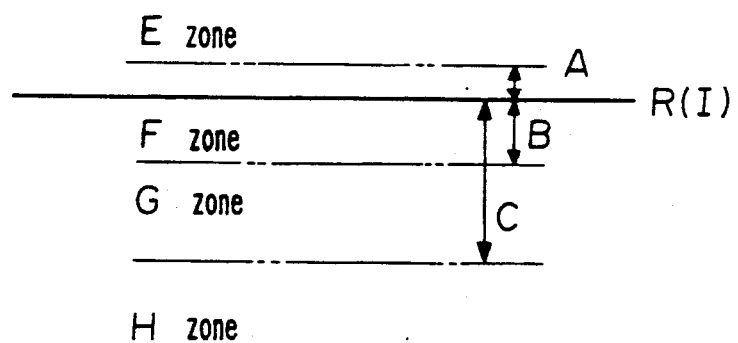
FIG. 11 is a drawing showing the relation between a set room temperature and a room temperature to help explain the modified embodiment of the second embodiment.
Figure 10:
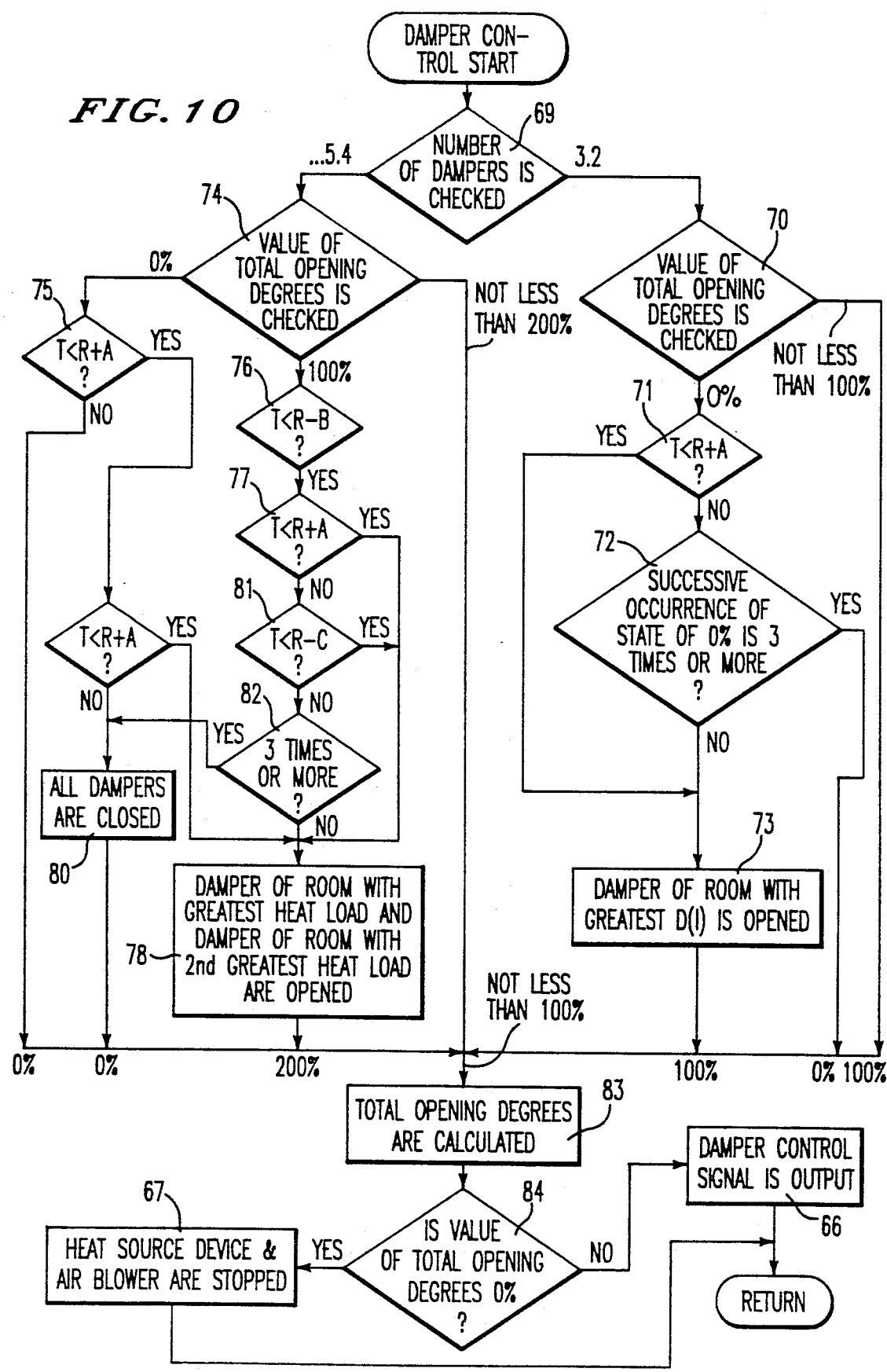
FIG. 10 is a flow chart to help explain the operation of a controller in a modified embodiment to the second embodiment.

FIG. 10 is the flow chart showing another embodiment of the control problem for the damper control, which is stored in the memory 22 of the microcomputer 20. FIG. 11 is the drawing showing the relation between a set room temperature and a room temperature to help explain the operation. In FIG. 10, the steps 53 through 59 as shown in FIG. 8 to be inserted before a step 69 are omitted for the sake of clarity. In addition, in FIG. 10, steps which execute the same processing as the steps 66 and 67 in FIG. 8 are indicated by the same reference numerals.

Steps 69 through 84 are a processing routine for the damper opening revising means 49. First, at the step 69, the number of the arranged dampers 4 is checked. The number of the dampers is input in the memory 22 at the time of installing the system. When the number of the dampers is not more than three, the processing proceeds to the step 70 for making the minimum value of the opening degrees to 100%. At the step 70, when the value of the total opening degrees is found to be not less than 100%, the processing proceeds to the step 83 as described later, without carrying out a special control. When the value of the total opening degrees is found to be zero %, the processing proceeds to the next step 71, where the room temperature T(I) and the set room temperature R(I) for the room with the greatest heat load are compared, and when the inequality, $T(I) < (R(I) + A)$ is not be satisfied, the processing proceeds to the next step 72. At the step 72, it is checked whether the state of zero % as the total opening degrees of the dampers is continued three times or more, and if affirmative, the processing proceeds to the step 83 without revising the opening degrees of the dampers. When, at the step 71, the inequality, $T(I) < (R(I) + A)$ is satisfied, or when, at the step 72, the state of zero is found to be continued less than three times, the processing proceeds to the step 73, where the damper of the room with the greatest heat load is revised from the closing position to the opening position. Changing the opening degree of the damper from the closing position to the opening position is usually done when the room temperature comes in a G zone as shown in FIG. 11. However, when the temperature in the room with the greatest heat load is in an F zone as shown in FIG. 11, the damper of this room is temporarily opened in order to prevent the heat source device 1 from being frequently stopped. Such control causes the average temperature in the room with the greatest heat load to be slightly beyond the set room temperature R(I), but does not cause the average room temperature to be far beyond the set room temperature. When the temperature in the room with the greatest heat load is in an E zone as shown in FIG. 11, the revision to the opening position is the maximum three times (at the step 72) since such control makes the room temperature disadvantageously higher and the number of revisions is restricted to three times. There is a possibility that the temperature in another room during this control goes down in the F zone or the G zone and the room with a greatest heat load is replaced by a different room. That can prevent the temperature in only a specific room from being controlled to have a higher level.

At the step 69, when the number of the dampers is found to be four or more, the processing proceeds to the step 74. At the step 74, when the value of the total opening degrees is not less than 200%, the processing proceeds to the step 83 without carrying out a special control. When the value of the total opening degrees is found to be zero %, the processing proceeds to the step 75, where the room temperature T(I) and the set room temperature R(I) for the room with the greatest heat load are compared, and when the inequality, $T(I)<(R(I)+A)$ is not satisfied, the processing proceeds to the step 83 without carrying out a special control.

At the step 74, when the value of the total opening degrees is found to be 100%, the processing proceeds to the step 76, where the room temperature T(I) and the set room temperature R(I) for the room with the greatest heat load, and when the inequality, $T(I)<(R(I)-B)$ is satisfied, the processing proceeds to the next step 77. At the step 77, the room temperature and the set room temperature for the room with the second greatest heat load are compared, and when the inequality, $T(I)<(R(I)+A)$ is satisfied, the processing proceeds to the next step 78, where the damper of the room with the greatest heat load and the damper of the room with the second greatest heat load are controlled to be in the opening position, and the processing proceeds to the step 83. When, at the step 75, it is found that the temperature and the set room temperature for the room with the greatest heat load satisfy the inequality, $T(I)<(R(I)+A)$, or when, at the step 76, it is found that the room temperature and the set room temperature for the room with the greatest heat load do not satisfy the inequality, $T(I)<(R(I)-B)$, the processing proceeds to the step 79. At the step 79, when it is found that the room temperature and the set room temperature for the room with the second greatest heat load satisfy the inequality, $T(I)<(R(I)+A)$, the processing proceeds to the step 78. When they do not satisfy the inequality, the processing proceeds to the next step 80. At the step 80, the damper that is in the opening position at that moment is revised to be in the closing position (all the dampers are closed), and the processing proceeds to the step 83.

At the step 77, when it is found that the room temperature and the set room temperature for the room with the second greatest heat load do not satisfy the inequality, $T(I)<(R(I)+A)$, the processing proceeds to the step 81. At the step 81, when the room temperature and the set room temperature for the room with the greatest heat load satisfy the inequality, $T(I)<(R(I)-C)$, the processing proceeds to the step 78. When they do not satisfy that inequality, the processing proceeds to the next step 82. At the step 82, the number of passing through this step is counted, and when it is three times or more, the processing proceeds to the step 80. When it is not three times or more, the processing proceeds to the step 78.

As explained, the damper control wherein the value of the total opening degrees is controlled to become at least 200% can prevent the room with the room temperature near to the set room temperature from being wastefully heated. When the room temperature in only one of the rooms does not reach the set room temperature, a control for making the temperature in this room approach to the set room temperature is required. For example, in a system having four dampers arranged, if the temperatures in the three rooms reach the respective set room temperatures and the temperature in only one of the rooms does not reach the set room temperature, it is impossible to open the damper of only that room because the minimum value of the total opening degree is restricted to 200%. As a result, it is necessary to judge whether the dampers of the four rooms are closed or the dampers of two of them are opened. At the steps 76 through 82, the following judgments are made:

| Temperature in the room with the greatest heat load | Temperature in the room with the second greatest heat load | Proccess |
|---|---|---|
| G or H zone | F zone | the dampers of two of the rooms are opened. |
| F zone | F zone | The dampers of two of the rooms are opened. |
| F zone | E zone | All the dampers are closed. |
| H zone | E zone | The dampers of two of the rooms are opened. |
| G zone | E zone | When the state of 0% continues not less than 3 times, the dampers of two of the rooms are opend. When the state of 0% continues 3 times or more, all the dampers are closed. |

The E zone is defined to be above $R(I)+A$. The F zone is defined to be between $R(I)+A$ and $R(I)-B$. The G zone is defined to be between $R(I)-B$ and $R(I)-C$. The H zone is defined to be below $R(I)-C$.

In accordance with the modified embodiment, the minimum value of the total opening degrees can be automatically arranged dampers 4a-4d.

In addition, when the damper opening determining means 48 determines the value of the total opening degrees to be 100% at the time of 200% as the minimum value of the total opening degrees, the opening degrees of the dampers are revised depending on the rise and fall in the temperatures of the room with the greatest heat load and of the room with the second greatest heat load. As a result, each room temperature can be controlled approximate each set room temperature. Further, it is possible to reduce the opportunity that all dampers 4a-4d are closed.

In accordance with the second embodiment and its modified embodiment, the opening and closing of each damper is decided by the damper opening determining means based on the output of the heat load measuring means, and when the value of the total opening degrees is small, the revision is made so that the value of the total opening degrees is increased by the damper opening revising means under the definite condition. This can reduce the opportunity that all the dampers are simultaneously closed, allows the heat source device and the air blower to be stably driven, and offers an advantage that the room temperatures are controlled to become almost the set values.

Next a third embodiment of the air conditioner according to the present invention will be described in reference to the accompanying drawings.

Figure 12:
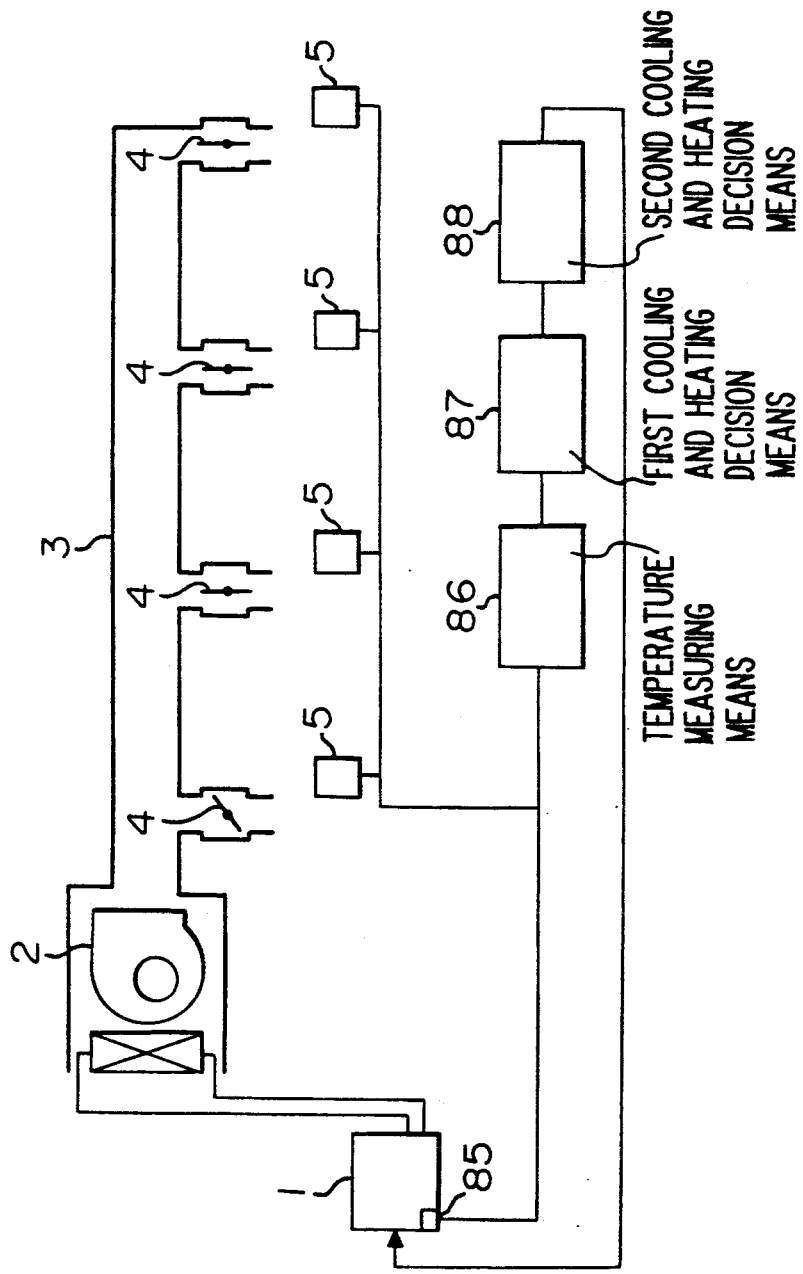
FIG. 12 is a schematic view showing the basic structure of a third embodiment of the air conditioner of the present invention.

FIG. 12 is the schematic view showing the principle of the specific structure of the third embodiment. In FIG. 12, the same reference numerals as those in FIGS. 1 and 2 designate similar parts. Explanation on the similar parts are omitted for the sake of clarity.

Reference numeral 85 designates an external air temperatures sensor for detecting the temperature outdoors. The system of the third embodiment is constructed so that temperature measuring means 86 receives inputs from the external air temperature sensor 85 and the thermostats 5 to measure the external air temperature and the temperature in each room; as the results of the measurement, first cooling and heating decision means 87 decides depending on the average room temperature whether cooling should be done or heating should be down, immediately after the operation mode has changed to the automation mode; and after that, second cooling and heating decision means 88 again decides depending on the external air temperature whether cooling should be done or heating should be done when the heat source device is at a standstill.

Figure 13:
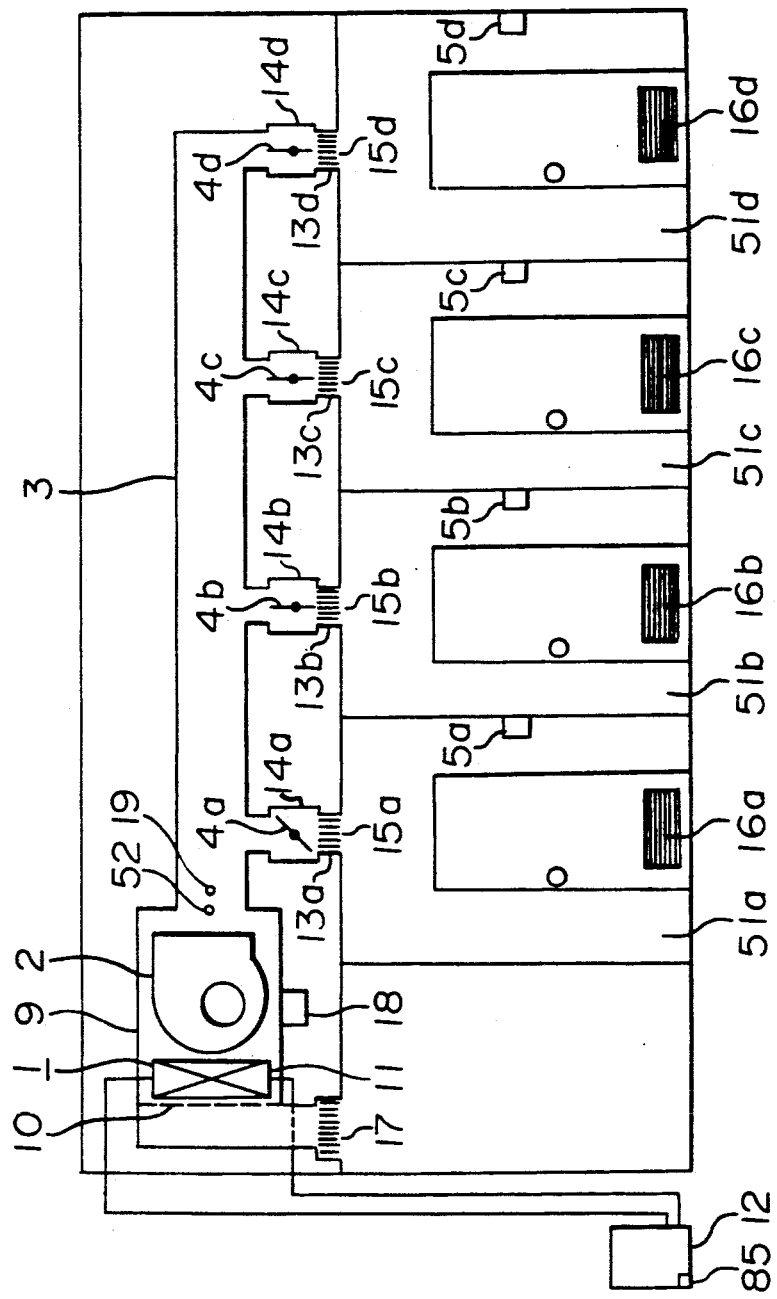
FIG. 13 is a schematic view showing the entire system of the third embodiment.

FIG. 13 is the schematic view showing the entire system of the air conditioner with the principle as shown in FIG. 12 applied. In FIG. 13, the same reference numerals as those in FIGS. 2 and 6 indicate similar parts. Explanation on the similar parts is omitted for the sake of the clarify. The external air temperature sensor 85 is arranged in the outdoor unit 12 which is placed outdoors, so as to detect an external air.

Figure 14:
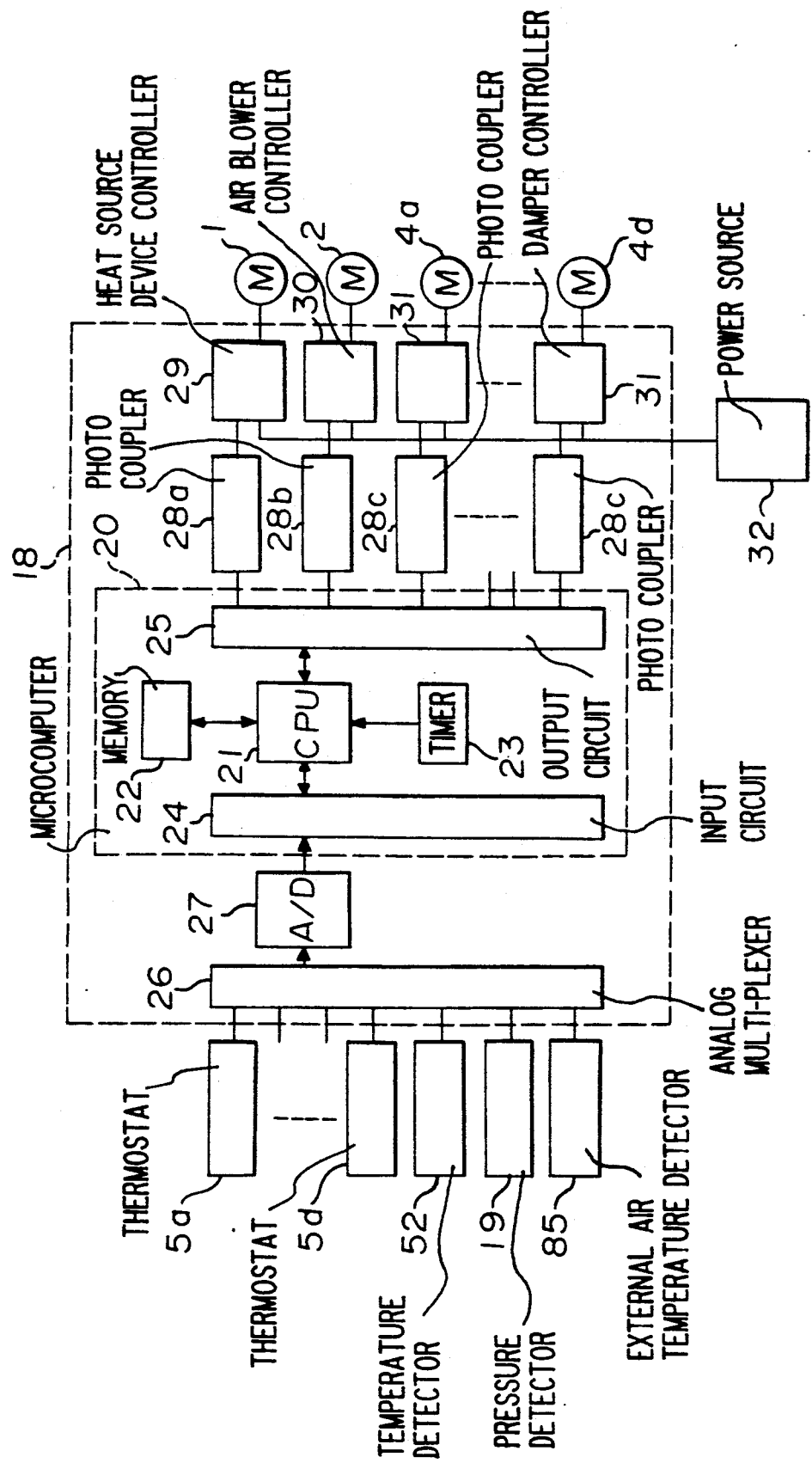
FIG. 14 is a block diagram showing the structure of a controller used in the third embodiment.

FIG. 14 is the block diagram showing a specific circuit of the controller 18. In FIG. 14, the same reference numerals as those in FIGS. 3 and 7 indicate similar parts. Explanation on the similar parts is omitted for the sake of clarify.

The output of the analog multi-plexer 26, to which detection signals from the room thermostats 5a-5d, the external air temperature sensor 85, the temperature sensor and the pressure sensor 19 are input, is converted into a digital signal by the A/D (analog/digital) converter 27 to be transmitted into the CPU21 through the input circuit 24.

Now, the operation of the third embodiment will be explained, referring to FIG. 15.

Figure 15:
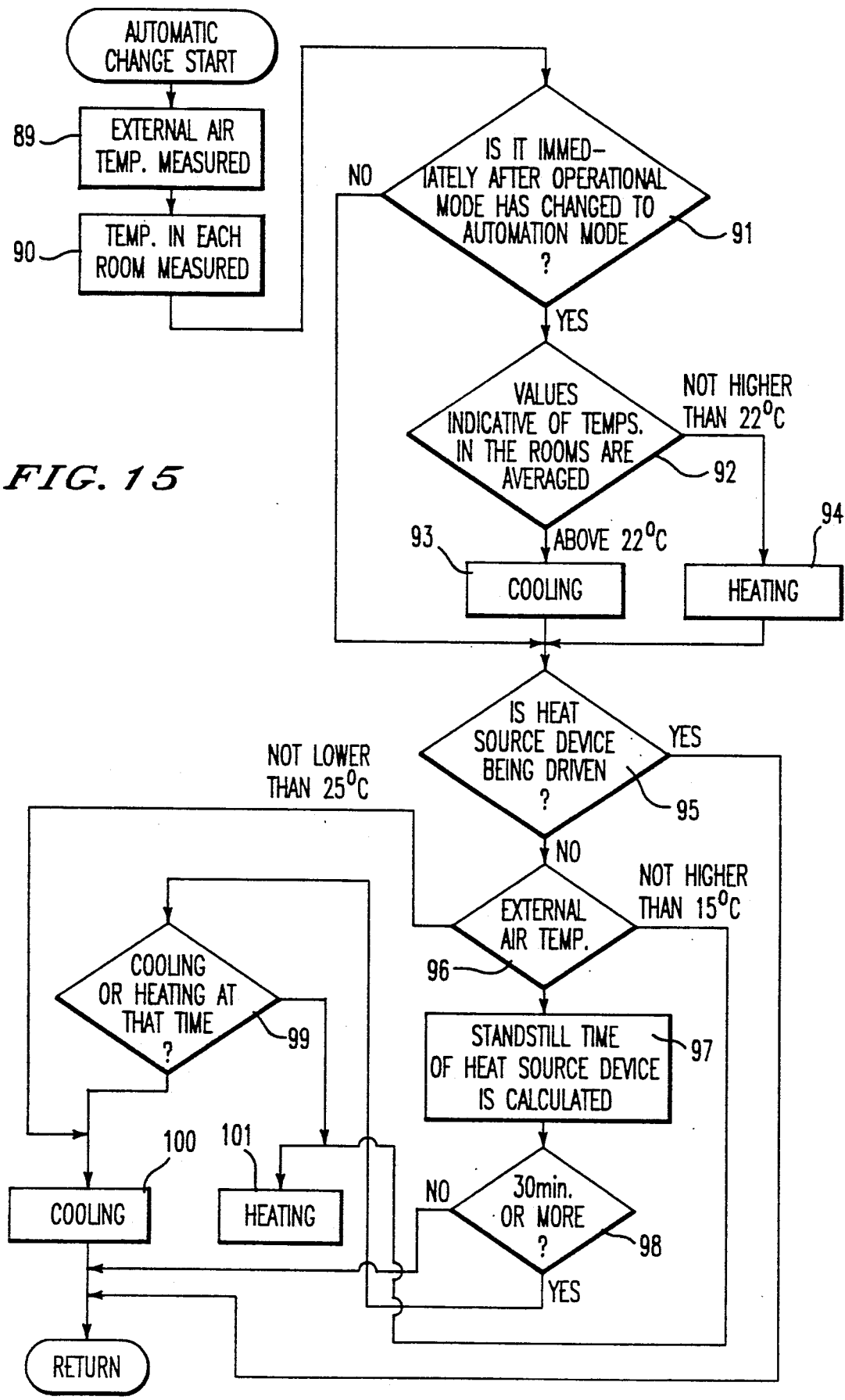
FIG. 15 is a flow chart to help explain the operation of the controller of FIG. 14.

FIG. 15 is the flow chart showing the control program for changing the cooling and the heating automatically, which is stored in the memory 22 of the microcomputer 20. The control program is executed when the operation mode is the automation mode.

At the temperature measuring means 86, the processing as shown in steps 89 and 90 is executed. Namely, the direction signal indicative of the external air temperature from the external air temperature sensor 85 and the detection signal indicative of the temperature in each room from the thermostat 5 are input to the CPU 21 through the analog multi-plexer 26, the A/D converter 27 and the input circuit 24.

At the first cooling and heating decision means 81, the processing as shown in steps 91 through 94 is executed. This processing is carried out regardless of whether heat source device 1 is driven or at a standstill. At the step 91, it is judged whether it is immediately after the operation mode has changed to the automation mode from another mode. The first cooling and heating decision means 87 can be constituted so as to operate when the operation mode has changed to the automation mode from all other modes, or so as to operate only when the "OFF" mode has changed to the automation mode or the ventilating mode has changed to the automation mode. In the latter case, when the cooling mode has changed to the automation mode, cooling is selected when the heating mode has changed to the automation mode, heating is selected, and when the automation mode has come to the automation mode again, selection of cooling and heating is carried out so as to select the air conditioning that was carried out in the former automation mode. At the step 91, when it is judged to be immediate after having changed to the automation mode, the processing proceeds to the next step 92, where the values indicative of the temperatures in the room measured at the step 90 are averaged, and it is judged whether the average value is higher than 22° C. In order to evaluate the average value, there are two manners. One is to evaluate the average value by averaging the temperatures in all rooms. The other is to evaluate the average value by averaging the temperatures of the rooms, provided that the temperature in the rooms wherein air conditioning is forcibly stopped by the thermostat 5 is not taken into account. Either of the manners is applicable. At the step 92, when it is judged that the average room temperature is above 22° C., cooling is selected. When it is judged that the average room temperature is not higher than 22° C., heating is selected.

At the second cooling and heating decision 88, the processing as shown in steps 95 through 101 in executed to carry out modification from cooling to heating and from heating to cooling during the automation mode operation. At the step 95, it is judged whether the heat source device 1 is being driven, and when it is driven, the processing escapes from the second cooling and heating decision means 88. When the heat source device 1 is at a standstill, the processing proceeds to the next step 96, which makes a judgment on the external air temperature detected at the step 89. When the external air temperature is not lower than 25° C., the processing proceeds to the step 100 to select cooling. When the external air temperature is not higher than 15° C., the processing proceeds to the step 101 to select heating, and after that, the processing escapes from the second cooling and heating decision means 88. When it is judged that the external air temperature between 15° C. and 25° C., the processing proceeds to the step 97, where the standstill time of the heat source device 1 is calculated. The next step 98 makes a judgment on the standstill time. When it is within 30 minutes, the processing escapes from the second cooling and heating decision means 88. When it is 30 minutes or more, the processing proceeds to the next step 99. At the step 99, when heating is selected at that time, the processing proceeds to the step 100 to select cooling. On the other hand, when cooling is selected at that moment, the processing proceeds to the step 101 to select heating.

The judgment on heating and cooling at the time of the automation mode is carried out as described above. The result of the judgment is sent from the CPU 21 to the heat source device controller 29 through the output circuit 25 and the photo coupler 28a to carry out the change between cooling and heating of the heat source device 1.

Imagine that cooling load is in the day time and heating load is in the night time. In accordance with the control of the third embodiment, when the operation mode is changed from the "OFF" mode to the automation mode in the day time, the first cooling and heating decision means 87 selects cooling because the average room temperature is high. Thus, the cooling operation starts to adjust the room temperatures to the set room temperatures. When the external air temperature lowers in the evening and the cooling load is decreased, the temperatures in the rooms become lower than the set room temperatures for cooling to close the dampers 4 in succession. When the dampers 4 of all the rooms are closed, the heat source device 1 is stopped. When the external air temperature is reduced further, the standstill state of the heat source device 1 is continued, and the temperatures in the rooms becomes significantly lower than the set room temperature. When the external air temperature goes down to between 15° C. and 25° C. and the standstill time of the heat source device 1 becomes beyond 30 minutes, the second cooling and heating decision means 88 selects heating. Since the room temperatures are lower than the set room temperatures for heating at that time, the dampers 4 are opened, and the heat source device 1 is driven again to carry out the heating operation, thereby adjusting the room temperatures to the set room temperatures for heating.

By the way, the reference temperatures as shown in the steps 92 and 96, and the reference time as shown in the step 98 are not restricted to the values of the third embodiment.

As explained in accordance with the third embodiment, the temperature measuring means measures the external air temperature and the temperatures in the rooms, and as the results of the measurement, the first cooling and heating decision means decides whether cooling should be done or heating should be done depending on the average room temperature, immediately after the operation mode has changed to the automation mode. After that the second cooling and heating decision means decides again whether cooling should be done or heating should be done depending on the external air temperature and the standstill time of the heat source device. As a result, even if the rooms have different set room temperatures, there is an advantage that it becomes possible to make an adequate hjudgment on heating and cooling depending on the heat load conditions.

Obviously, numerous modifications and variations of the present invention are possible in light of the above teachings. It is therefore to be understood that within the scope of the appended claims, the invention may be practiced otherwise than a specifically described herein.

What is claimed is:

1. A system for cooling and heating, comprising:
   a heat source device having means for producing heated and cooled air,
   an air blower for feeding heated air and cooled air,
   a duct with branch ducts for directing the heated air and cooled air,
   dampers arranged in the branch ducts,
   room thermostats arranged in rooms,
   heat load measuring means for detecting signals from the room thermostats, measuring the heat load of each room and arranging said heat loads in order of magnitude,
   damper opening determining means for carrying out a room temperature control based on the results of the measurement by the heat load measuring means,
   damper opening revision means for revising an opening degree of the damper for the room with the greatest heat load to be open when a value of the total opening degrees of the dampers given by the room temperature control of the damper opening determining means is not higher than a predetermined value, and
   damper control means for controlling the opening and closing of the damper of each room based on the output of the damper opening revision means.

2. A system according to claim 1, wherein the heat load measuring means is constructed so that signals indicative of the room temperature T(I) and the set room temperature R(I) from each room thermostat (I) are detected, the heat load of each room is the difference D(I) between the set temperature T(I) and the set room temperature R(I).

3. A system according to claim 2, wherein the damper opening determining means is constructed such that the opening and closing of the damper of each room is decided. so that the temperature in each room comes into the range of R(I)+A and R(I)−B.

4. A system according to claim 1, wherein the damper opening revising means is constructed so that the minimum value of the total opening degrees of dampers depends on the number of the dampers and when the value of the total opening degrees determined by the damper opening determining means becomes lower than said minimum value of the total opening degrees, the damper for the room having the greatest heat load is revised to be open with additional rooms being revised to be opened until said minimum value of the total opening degrees is reached.

5. A system according to claim 4, wherein the damper opening revising means is constructed so that when the value of the total opening degrees of the dampers is 100%, and 200% is said minimum value of the total opening degrees, the damper for the room with the greatest heat load and the damper for the room with the second greatest head load are revised to be open.

6. A system according to claim 4, wherein the damper opening revising means is constructed so that when the value of the total opening degrees of the dampers is zero % (all the dampers are closed, and 100% is said minimum value of the total opening degrees, and when the temperature in the room with the greatest heat load is lower R(I)+A (at the time of the heating) or higher than R(I)−B (at the time of cooling), where R(I) is the set room temperature for each room thermostat and A and B are fixed values the damper for said room with the greatest heat load is revised to be open.

7. A system according to claim 4, wherein the damper opening revising means is constructed so that when the value of the total opening degrees of the dampers is zero %, and 200% is said minimum value of the total opening degrees and when the temperature in the rooms with the greatest heat load is lower than R(I)+A (at the time of heating) or higher than R(I)−B (at the time of cooling), where R(I) is the set room temperature for each room thermostat and A and B are fixed values the damper for said rooms with the greatest heat load and the second greatest heat load are revised to be open.

8. A system according to claim 7, wherein the damper opening revising means is constructed so that when the value of the total opening degrees of the dampers is 100% or zero %, and 200% is said minimum value of the total opening degrees, the greatest heat load D(I) is compared to the second greatest heat load D(I), where D(I) is the difference between the set temperature and the room temperature for each room thermostat to determine whether the dampers of these rooms are revised to be open or all the dampers are revised to be closed.

* * * * *